United States Patent

Unger et al.

[11] Patent Number: 5,985,166
[45] Date of Patent: Nov. 16, 1999

[54] CHEMICAL ETCHING OF FIBER PROBE

[75] Inventors: Marc A. Unger; Dmitri A. Kossakovski, both of Pasadena, Calif.

[73] Assignee: California Institute of Technology, Pasadena, Calif.

[21] Appl. No.: 08/960,034
[22] Filed: Oct. 29, 1997
[51] Int. Cl.[6] .................................................. B44C 1/22
[52] U.S. Cl. .............................................. 216/97; 216/11
[58] Field of Search ................................... 216/11, 24, 96, 216/97, 108, 109

[56] References Cited

U.S. PATENT DOCUMENTS

| | | | |
|---|---|---|---|
| 4,469,554 | 9/1984 | Turner | 156/657 |
| 5,525,800 | 6/1996 | Sanghera et al. | 250/339.08 |
| 5,714,196 | 2/1998 | Vacha | 427/154 |

OTHER PUBLICATIONS

A. Piednoir, et al. "Imagining and Local Infrared Spectroscopy With A Near Filed Optical Microscope" Elsevier Science B.V.

P. Hoffmann, et al., "Comparison of Mechanically Drawn and Protection Layer Chemically Etched Optical Fiber Tips", 1996 Elsevier Science B.V.

*Primary Examiner*—Bruce Breneman
*Assistant Examiner*—Shamim Ahmed
*Attorney, Agent, or Firm*—Fish & Richardson P.C.

[57] ABSTRACT

A two-phase etching system having an etchant solution and an overlayer of a protective solvent. The physical properties of the etchant solution and the protective solvent are matched to form a substantially flat meniscus on the top surface of the etchant solution around a fiber immersed in the protective solvent and the etchant solution. Convective flows within the etchant solution are maintained to form a smooth and sharp fiber probe with a small tip apex.

21 Claims, 6 Drawing Sheets

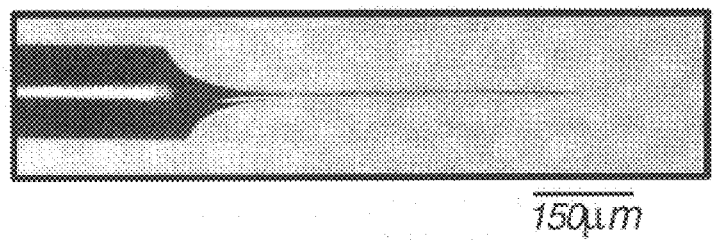
FIG 12
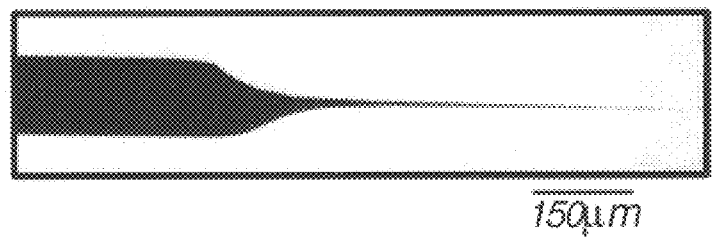
FIG 13
FIG 14A
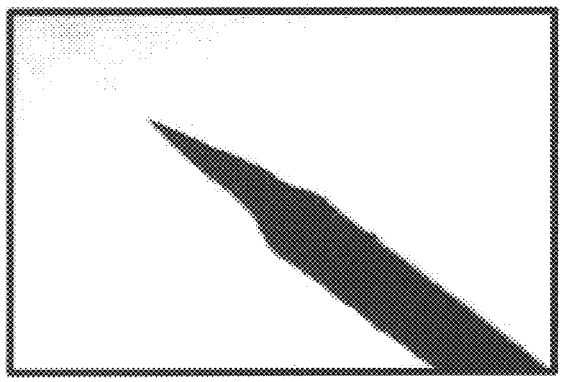
FIG 14B
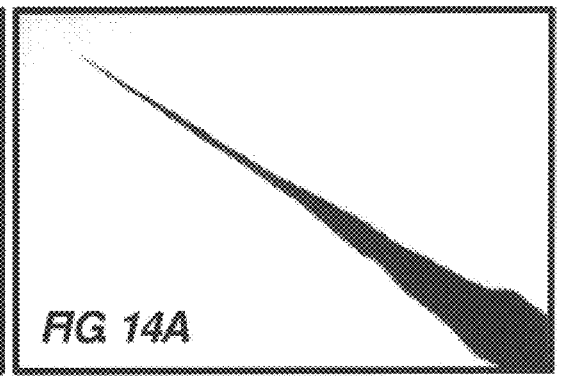
FIG 14A
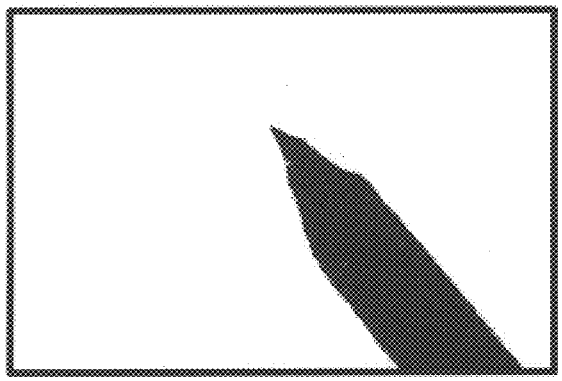
FIG 14C

CHEMICAL ETCHING OF FIBER PROBE

FIELD OF THE INVENTION

The invention relates to chemical etching of fibers, and more specifically to chemical etching of infrared fibers to form an optical probe.

BACKGROUND OF THE INVENTION

An end of a piece of optical fiber can be shaped into a cone or tapered section. The tip of the cone or tapered section forms a small optical aperture for transmitting light. This can be used as an optical probe in a "near-field" configuration in which light is coupled between two elements separated by a spacing less than one wavelength of the light. In the near-field configuration, the "far-field" approximation to the propagation behaviors of electromagnetic waves is no longer valid. One result of such near-field optical configuration is a spatial resolution higher than what is permissible by the far-field diffraction limit in optical sensing.

Near-field scanning optical microscopy ("NSOM") explores the above property of the near-field optical sensing to achieve a spatial resolution of down to about one fiftieth of a wavelength. This compares favorably to the far-field diffraction limit which is approximately one half of a wavelength.

A near-field scanning optical microscope can be implemented with an optical fiber probe. As with almost all scanned probe techniques, the performance of a near-field scanning optical microscope is significantly determined by the quality of the optical probe. One challenge in achieving such a high resolution is construction of a probe with an aperture of the size of the desired feature size.

FIG. 1 shows a typical structure of a fiber probe 100 which includes a fiber body 106, a cone or tapered section 104, and a tip aperture with a tip apex 102. To resolve a feature much smaller than one wavelength, the size of the tip aperture should be about the feature size. Several other parameters may also affect the performance of a fiber probe, such as transmission wavelength range, mechanical properties of the probe material, and the geometry of the tapered section 104 of the probe.

For a given fiber material, the quality of the probe is largely determined by the tip aperture and the geometry of the tapered section. In general, the tip aperture should be as small as possible since it determines the minimum resolvable feature size. One parameter for characterizing the size of the tip aperture is the radius of curvature of the tip apex 102. A smaller radius of the tip curvature can resolve smaller features and produces higher resolution.

Light coupling efficiency or light throughput is another measure of the performance of a fiber probe. The surface quality of the tip apex 102 and the geometry of the tapered section 104 can affect the light coupling efficiency. In particular, the length of the tapered section 104 should be small in order to increase the light coupling efficiency of the probe. This is at least in part due to the cross-section of the tapered section 104 decreasing from the fiber body 106 to the tip apex 102 to a diameter smaller than the wavelength. A longer tapered region 104 requires radiation to propagate a longer distance within a confined dimension smaller than its wavelength. This reduces the light energy transmitted through the region. Thus, a short taper section 104 and a large cone angle $\Theta$ are desirable.

One method of making fiber probes is mechanical pulling. A fiber is first heated by a laser beam or a filament to a soft state at an elevated temperature and subsequently is pulled to form a tapered section and a tip. The tapered section of a probe may be coated with metal except for an aperture at the tip apex.

Another method of making fiber probes is by chemically etching the fiber material by using an active chemical etchant solution. Chemical etching is advantageous over the mechanical pulling in that higher light coupling efficiency can be achieved. Zeisel et al. has shown that chemically etched optical fiber probes have light throughput of about 100–1000 times greater than mechanically pulled fiber probes. Zeisel et al., Applied Physics Letters, Vol. 68(18), p. 2491 (1996). It is recognized that chemically etched fiber probes usually have shorter tapered region, smoother tip surface, and smaller radius of tip apex curvature than mechanically pulled probes.

One etching approach involves full immersion of a mechanically cleaved fiber end into a hydrofluoric acid solution. This method usually produces a sharp tip and a long tapered section (e.g. 10 mm long for a silica fiber of 125 $\mu$m in diameter). However, such a probe can be mechanically fragile. See, for example, Radojewski et al., International Journal of Electronics, Vol. 76(5), pp. 973–980 (1994).

An alternative etching approach uses a layer of protection liquid on top of the etchant liquid to automatically terminate the etching process. See, for example, U.S. Pat. No. 4,469,554 to Turner, and Hoffmann et al., "Comparison of mechanically drawn and protection layer chemically etched optic fiber tips", Ultramicroscopy 61, pp. 165–170 (1995). According to this method, a portion of a fiber is immersed in the etchant liquid. The tip formation takes place at the interface of the etching liquid and the protection liquid layer. The etching process is self-terminated as the fiber portion immersed in the etching liquid is etched away to form a tip within the protection layer and the etching liquid breaks away from the fiber tip.

Many NSOM instruments operate in the optical spectral range from about 375 nm to about 850 nm. Fiber probes are usually made of quartz glass ($SiO_2$) fibers. A near-field scanning infrared microscope ("NSIM"), operating in the infrared region from submicron to about 10 $\mu$m, is an advantageous extrapolation of the NSOM technique for several reasons. For example, not all molecules have absorption bands in the visible region but almost every molecule has absorption bands in the IR region. Therefore, NSIM instruments can be used to detect more molecular species than NSOM. Also, IR absorption bands provide direct information about the presence and nature of chemical bonds in the observed spectral region. Hence, NSIM can be a useful tool in many applications.

One suitable set of compounds for IR-transmitting fibers is the chalcogenides. Chalcogenide fibers have good chemical stability and are less brittle than the other families of compounds for IR fibers. Like optical fibers, they are also glasses and can be heat-pulled with a capillary puller in a fashion similar to pulling regular optical fibers. However, heat-pulling of chalcogenide fibers is much more difficult than heat-pulling of glass fibers (e.g., $SiO_2$). Moreover, the throughput of heat-pulled fibers is low. For example, Hong et al. report low light throughput in a range of about $10^{-4}$ to about $10^{-6}$ in heat-pulled IR fibers (Proceedings of SPIE 2863, pp. 54, 1996). This probably is in part due to a long tapered section of several mm as shown in a micrograph of FIG. 2 which was produced by using a scanning electron microscope.

SUMMARY OF THE INVENTION

The present disclosure describes a two-phase chemical etching process and system for shaping optical fibers. One embodiment of the two-phase etching system comprises a lower-phase aqueous oxidizing etchant and an upper-phase protective solvent overlayer. The oxidizing etchant is chemically reactive while the protective solvent is substantially inert. Preferably, the etchant and the protective solvent are substantially immiscible with respect to each other and the density of the protective solvent is less than that of the etchant. The etchant and the solvent are preferably chosen so that the meniscus of the etchant formed at the interface of the two liquid phases surrounding the submerged portion of a material to be etched is substantially flat. Convective flows within the aqueous etchant surrounding the immersed material are preferably maintained.

In operation, one end of a fiber is immersed in the etchant which is preferably unstirred. The immersed portion is etched to form an initial "neck" at a location within the etchant near the meniscus and eventually the portion below the neck falls off, thus forming a tip within the etchant.

For etching chalcogenide glass fibers operating in the IR range, a mixture of oxidizing acid and hydrogen peroxide may be used as the etchant solution. According to one embodiment, piranha solution, i.e., an approximately 7:3 mixture by volume of concentrated sulfuric acid and hydrogen peroxide of 30% water solution, may be used with various organic compounds as the protective solvent. Suitable protective solvents include but are not limited to, tetramethylpentadecane (TMPD), polydimethylsiloxane (PDMS) and $CCl_4$.

Chalcogenide IR fibers can be processed using two-phase etching to from a sub-micron tip apex. First, the polymer coating of a fiber is removed. Next, the fiber cladding is stripped. Finally, the chalcogenide fiber core is etched to a sharp point by using a two-phase etching system. The resulting fibers have a taper length on the order of the core diameter and terminate with a sub-micron radius of tip curvature.

One advantage of the two-phase etching is the short tapered section and smooth and small tip apex of the etched fibers. Another advantage is that the geometry and quality of the etched probes are consistent and controllable.

These and other features and advantages will become more apparent in light of the following detailed description, including the accompanying drawings and the appended claims.

BRIEF DESCRIPTION OF THE DRAWINGS

FIG. 12 is an optical micrograph of a 145 $\mu$m core chalcogenide fiber etched at a reduced temperature of about 5° C. (scale bar=150 $\mu$m).

FIG. 13 is an optical micrograph of a 145 $\mu$m core chalcogenide fiber etched in stirred piranha solution at the room temperature (scale bar=150 $\mu$m).

FIGS. 14A, 14B, and 14C show optical micrographs of asymmetrical and corrugated tips that are etched without protective solvent overlayers (scale bar=150 $\mu$m).

DESCRIPTION OF THE INVENTION

The present disclosure involves two-phase etching system to etch an optical fiber to form a fiber probe with a small tip apex, short tapered section and a large cone angle. It should be understood that etching optical fibers is described as an example and should not be construed as a limitation of the invention.

Figure 1:
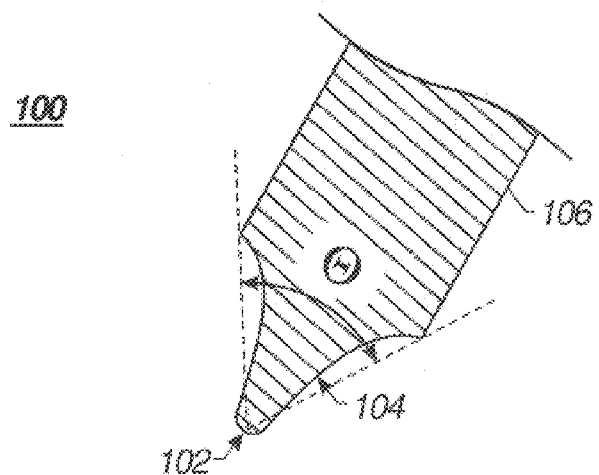
FIG. 1 is a diagram showing the structure of a typical optical fiber probe.
Figure 2:
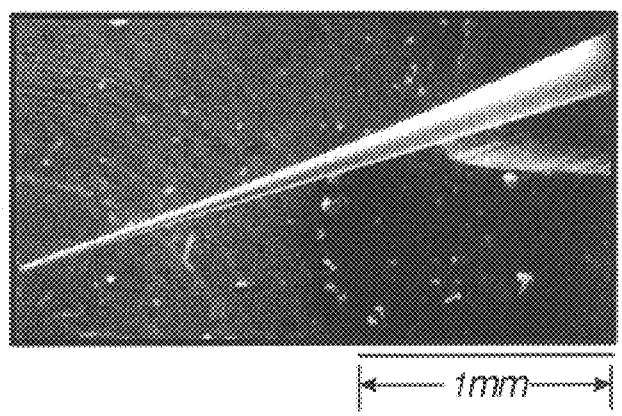
FIG. 2 is a micrograph of a heat-pulled chalcogenide fiber produced by a scanning electron microscope (scale bar=1 mm).
Figure 3:
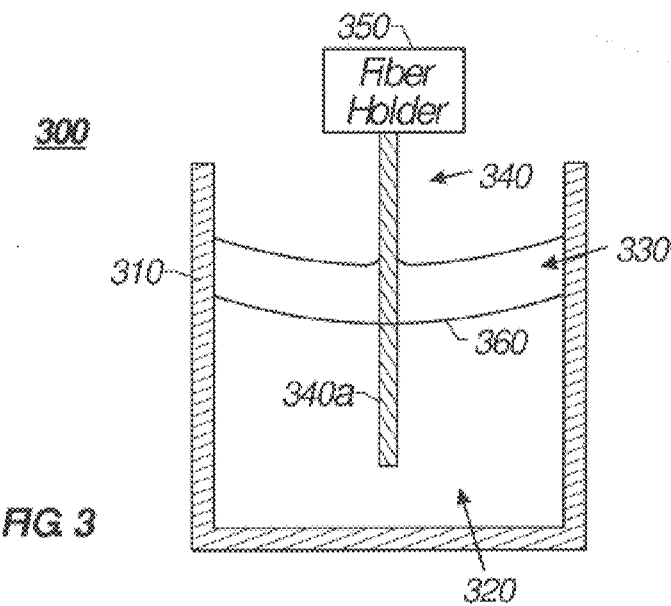
FIG. 3 is a schematic diagram of a two-phase etching system in accordance with the invention.

FIG. 3 shows a two-phase etching system 300 according to one embodiment of the invention. A container 310 has a lower phase 320 which is an aqueous etchant and an upper phase 330 which is an overlayer of a protective solvent. An end of an optical fiber 340 held by a fiber holder 350 is immersed in the liquids 320 and 330. The etchant 320 is chemically reactive to the fiber 340 while the protective solvent 330 is substantially inert to the fiber 340. The etchant 320 and the protective solvent 330 are substantially immiscible with respect to each other and form an interface on the top surface 360 of the etchant 320. In addition, the density of the protective solvent 330 is preferably less than that of the etchant 320 so that the protective solvent 330 remains on top of the etchant 320 in the container 310.

The physical properties of the etchant 320 and the protective solvent 330, such as density, viscosity, and surface tension, can be chosen relative to each other so that the meniscus formed on the top surface 360 of the etchant 320 surrounding the optical fiber 340 is substantially flat. When the meniscus is flat, the interfacial energy of the interface between the material 340 and the etchant 320 due to the surface tension is approximately equal to the interfacial energy of the interface between the material 340 and the protective solvent 330.

The dimension of the container 310 is preferably sufficiently larger than the cross-section of the fiber 340 so that a convective flow within the aqueous etchant 320 near the submerged portion of the fiber 340a can be maintained. For typical fibers of several hundred microns in diameter, the thickness of the convective flow layer may be on the order of millimeters. Furthermore, the volume of the container 310 is preferably sufficiently large to hold enough fresh etchant 320 to completely dissolve the inserted portion 340a of the fiber 340.

Figure 4A:
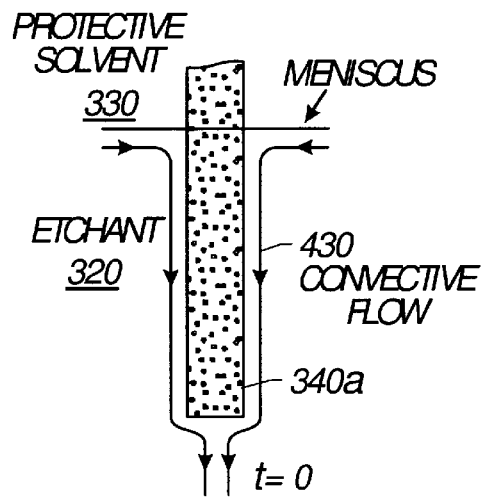
FIGS. 4A, 4B, and 4C are schematic diagrams showing the two-phase etching mechanism under convective control.
Figure 4B:
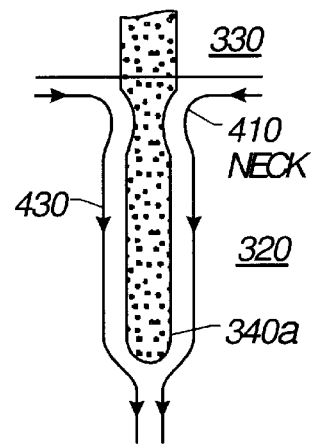
Figure 4C:
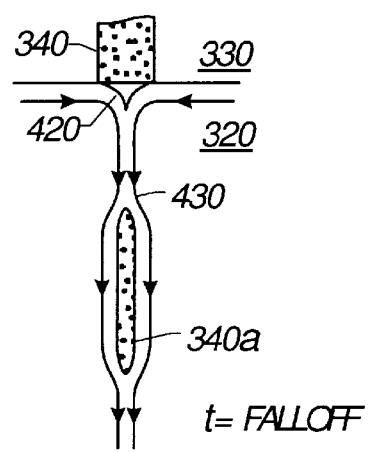

In operation, one end of the fiber 340 is immersed in the etchant 320. FIG. 4A shows the system at the beginning of etching. Preferably, the etchant 320 should not be stirred. The immersed portion 340a is etched to form a "neck" 410 at a location within the etchant 320 near the meniscus (FIG. 4B). As etching continues, the neck 410 is etched away faster than the rest of the submerged portion 340a which eventually falls off. This is illustrated in FIG. 4C. A tapered tip 420 is thus formed on the fiber 340. The fiber 340 is then withdrawn from the etchant and washed. Finally, the etched tip may be dried by gently blowing a gas (e.g., air or nitrogen) along the cylindrical axis towards the tip.

Chalcogenide glass fibers may be etched with the two-phase etching system 300 by using a mixture of oxidizing acid and hydrogen peroxide as the etchant solution. For example, a piranha solution with a 7:3 mixture by volume of concentrated sulfuric acid (e.g., $H_2SO_4$) and hydrogen peroxide of 30% water solution may be used. Various organic compounds may serve as the protective solvent, including but not limited to, tetramethylpentadecane (TMPD), polydimethylsiloxane (PDMS) and $CCl_4$. TMPD may be used in combination with piranha solution to achieve an improved long-term stability of the etchant system.

One aspect of the invention is etching an IR-transmitting optical fiber probe and in particular etching chalcogenide fibers. Chalcogenide fiber probes etched the two-phase system 300 usually taper to a sharp point with a radius of curvature of less than about 150 nm at the tip apex over a length of approximately one fiber diameter along the fiber axis. Examples of etching chalcogenide fiber probes and methods of removing polyamide plastic coatings and SSe cladding on the fibers are described below. Testing results suggest that an approximate 100-fold increase in light throughput over conventionally pulled-fiber probes has been achieved. This is consistent with the reduction in the length of the tapered section by the two-phase etching system of the invention.

In the following examples, chalcogenide fibers manufactured by Amorphous Materials, Inc. (3130 Benton, Garland, Tex. 75042) were used. Both thin (unclad, but plastic coated) and thick (clad and plastic coated) fibers were used in etching fiber probes. The chalcogenide core is made of an As-Se-Te glass. The cladding is primarily SSe. Both types of fiber are Plate #94-131-8, Run #71395.

Thin fibers have a core diameter of about 0.0058 inch (about 145 $\mu$m) and a polyamide coating 0.0009 inch (about 22.5 $\mu$m) thick (for a total fiber diameter of 0.0076 inch (about 190 $\mu$m).

Thick fibers have a core diameter of 0.010 inch (about 250 $\mu$m), S-Se cladding 0.004 inch (about 100 $\mu$m) thick, and a polyamide coating 0.003 inch (about 75 $\mu$m) thick for a total fiber diameter of 0.024 inch (about 600 $\mu$m)

An optical microscope with an epi-fluorescence/reflectance microscopy attachment was used to inspect the fibers. The polyamide coating is slightly fluorescent under illumination of blue or green light, making it easy to determine the presence of the polyamide coating. Microscopy of the probes under both backlighting and reflected light is used to determine the shape of the fiber.

The probe tip can be inspected by using a scanning electron microscope. Since chalcogenides are semiconductors, sputtering the tips with gold is therefore not strictly necessary, although gold or other metallic coatings may be used to improve image clarity at very high magnifications.

Removal of Polyamide Coating

The polyamide coating can be removed by repeatedly immersing the coated fiber in stirred solvent for several minutes (e.g., 1–2 minutes) at room-temperature and wiping with a laboratory tissue or the like. A number of solvents may be used for this purpose, including but not limited to, 4-chloro-1-butanol, methanol, and acetone. The surface of properly stripped fibers appears smooth when wiped with a laboratory tissue or the like. If not all the polymer has been removed, higher friction can be noticed.

Removal of Cladding

If a fiber is clad, the fiber cladding should be removed before etching. One commonly used cladding is SSe. The cladding can be removed by first soaking the polyamide-stripped fiber in a NaOH solution with a concentration of 0.1 M at the room temperature for approximately 18 hours. Higher concentrations may be used to reduce the soaking time. At the end of this time, the portion of the fiber immersed in the NaOH solution generally has lost its reflective sheen. The treated portion of the cladding then can be removed from the core by, for example, wiping gently with a laboratory tissue or the like.

If the fiber is removed from the NaOH solution too soon before the fiber loses its reflective sheen, the cladding may be difficult to remove or could not be completely removed by wiping. In this case, the fiber may be safely put back in the NaOH solution. If the fiber is left too long in the NaOH solution (e.g., longer than 24 hours in the 0.1M NaOH solution), the NaOH may slowly start etching the chalcogenide core.

Etching of Chalcogenide Core

Once the core has been exposed, etching can be performed by using the two-phase etching system 300 of FIG. 3. A protection layer of tetramethylpentadecane (TMPD) and an etchant of piranha solution may be used. The protective solvent overlayer may be about 1 to 2 mm thick. The protective solvent serves to keep the meniscus substantially flat at the fiber-etchant interface.

Figure 5:
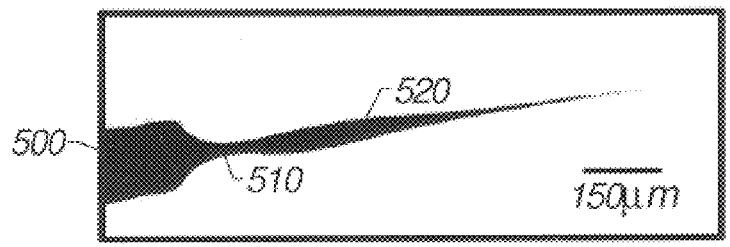
FIG. 5 is an optical micrograph of a fiber with a core diameter of 145 $\mu$m which was removed from the etching solution before the falloff point (scale bar=150 $\mu$m).

The chalcogenide fiber is immersed in the etching system. At room temperature and without stirring, the fiber usually forms a "neck" at a location approximately one fiber diameter down from the solvent-piranha meniscus. FIG. 5 shows a pronounced neck 510 formed on a fiber core 500 before the neck is etched through. Ultimately, the neck 510 will be completely etched through, and the lower piece 520 will fall off. This is referred to as the "falloff point".

The etching time for reaching "falloff" depends on the age of the piranha solution, its temperature, and the thickness of the chalcogenide core 500. As a guideline, with freshly made piranha at room temperature, and a 145 $\mu$m core, etching takes about 15 minutes. With 2-month old piranha (stored at about 5° C.) and a 250 $\mu$m core, etching takes approximately 50 minutes at the room temperature.

Approximately 30 seconds after the "falloff", the fiber is withdrawn from the etchant and washed in gently stirred methanol at the room temperature. Next, the tip is gently blown dry with $N_2$ blowing along the fiber axis towards the tip, rather than from the side.

Figure 6:
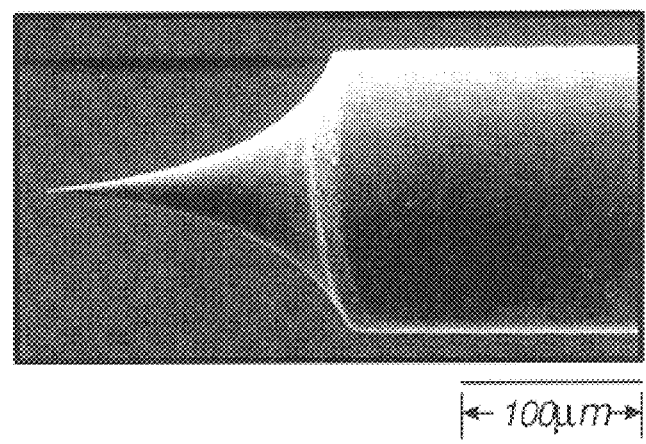
FIG. 6 is a SEM micrograph of a 145 $\mu$m diameter core chalcogenide fiber etched by the two-phase etching process of the invention (scale bar=100 $\mu$m).
Figure 7:
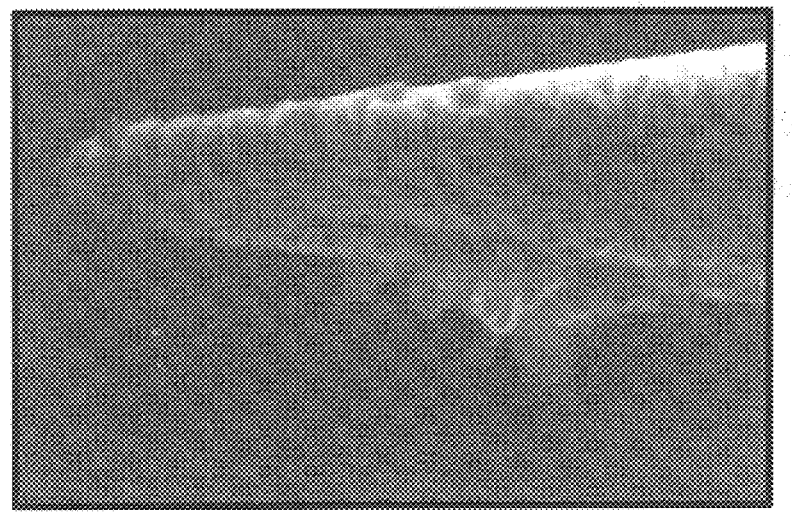
FIG. 7 is a SEM micrograph showing a further magnified image (scale bar=1 $\mu$m) of the apex of the tip shown in FIG. 6.
Figure 8:
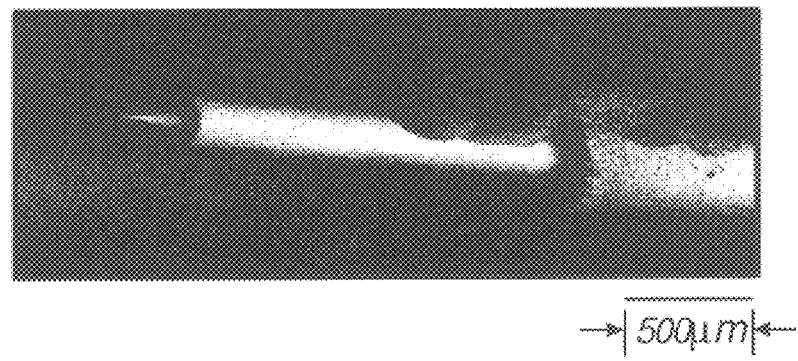
FIG. 8 is a SEM micrograph of a clad 250 $\mu$m diameter core chalcogenide fiber etched by the two-phase etching process of the invention (scale bar=500 $\mu$m).
Figure 9:
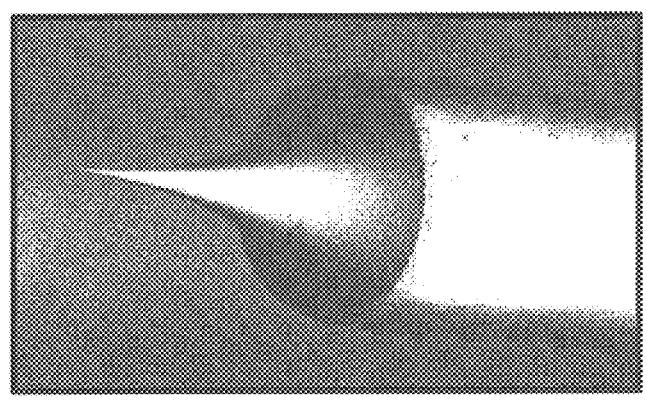
FIG. 9 is a magnified SEM image of the tip shown in FIG. 8 (scale bar=250 $\mu$m).
Figure 10:
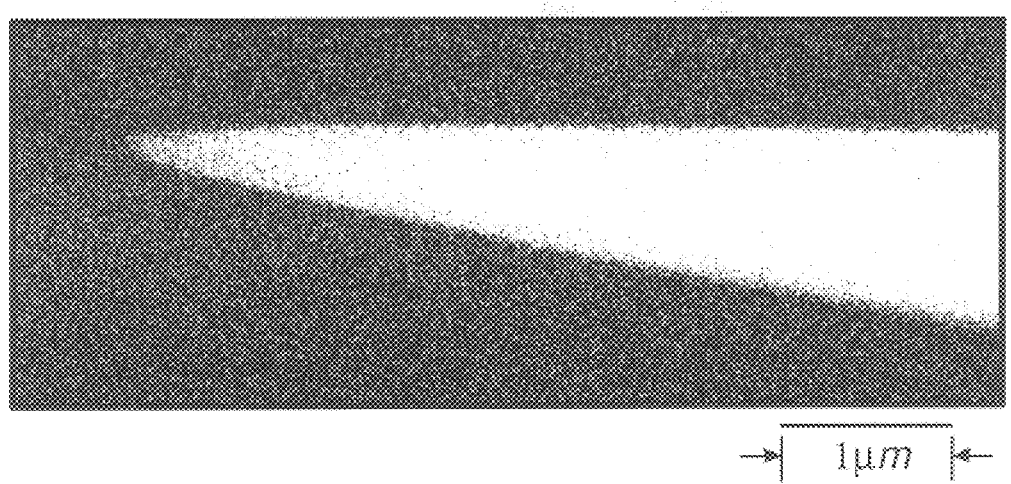
FIG. 10 is a further magnified SEM image of the tip shown in FIG. 8 (scale bar=1 $\mu$m)
Figure 11A:
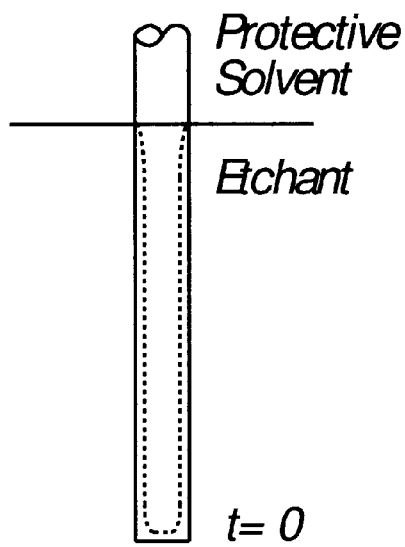
FIGS. 11A, 11B, 11C, and 11D are schematic diagrams illustrating the two-phase etching mechanism under conditions of isotropic etching, in which the dotted lines qualitatively indicate rates of etching, or the new profile of the tip after a discrete time-interval.
Figure 11B:
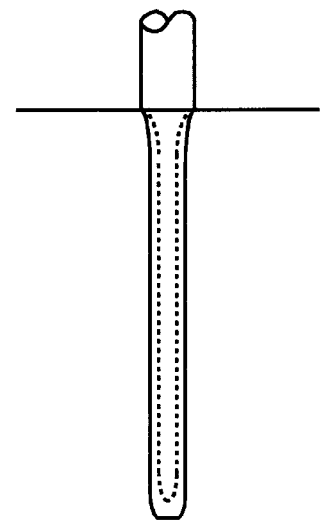
Figure 11C:
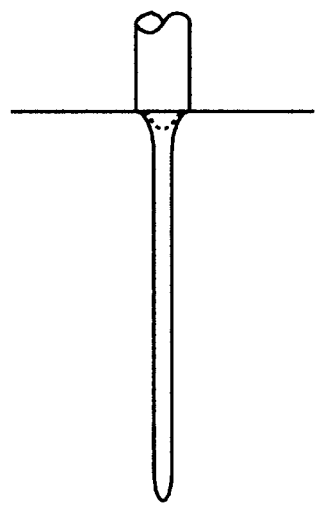
Figure 11D:
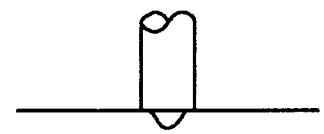

FIGS. 6 and 7 respectively show micrographs of an etched unclad 145 $\mu$m fiber by using a scanning electron microscope (SEM). The corrugations and the structure on the underside of the tip are believed to be due to the thin layer of gold applied for SEM imaging. FIGS. 8, 9, and 10 are SEM micrographs of different scales showing an etched, clad fiber with a 250 $\mu$m core. In FIG. 8, removal of the clad and etching of the core are visible and the "blob" at the top is silver paint applied to provide a conductive path to ground for SEM imaging.

The above processing method resulted in sharp tips with a taper length on the order of the core diameter and a radius of curvature of the tip apex generally less than about 150 $\mu$m. In general, the tips are concave-conical in shape and have a smooth tip apex.

Chalcogenide Core Etching Mechanism

It is a belief of the inventors that the unique tip formation produced by the two-phase etching is in part caused by a convective flow in the etchant. The etching mechanism may be explained with the following hypothetical convection flow model.

Referring to FIGS. 4A–4C, as the etching agent dissolves the immersed portion 340a of the fiber core 340, the solution density of the etchant increases in the proximity of the fiber surface. Thus, the etching solution near the fiber surface is more dense than the rest of the solution and flows down along the fiber due to gravity. This forms a convective flow 430 which is substantially laminar under these conditions. As the dense solution flows down along the fiber 340a, more etchant solution will move in to take its place. Since there is a fluid layer moving parallel to the surface of the fiber 340a everywhere except the location close to the meniscus where the fiber 340 enters the etchant 320, new etchant solution enters the convection pattern primarily at the meniscus, as illustrated in FIGS. 4A–4C. Therefore, the etchant solution contacting the fiber 340 at the meniscus contains a higher concentration of $H_2O_2$ and acid and less dissolved chalcogenide. As a result, the fiber section at or near the meniscus is etched faster than other fiber section immersed in the etchant 320 to produce the observed "necking" effect. Eventually the "neck" is completely dissolved away, and the fiber below the neck falls off.

According to the above convective control hypothesis, if the effects of convection are reduced relative to diffusion and reaction, more isotropic etching would be expected. FIGS. 11A, 11B, 11C and 11D illustrate such isotropic etching wherein no necking effect occurs. Three different experiments were performed to test this prediction. In the first experiment, etching was performed in the normal two-phase etching apparatus as shown in FIG. 3, but at a temperature below the room temperature. Reduction in temperature increases the viscosity of the piranha solution and decreases the flow speed of the convective flow. FIG. 12 is an optical micrograph of a 145 $\mu$m chalcogenide fiber etched at 5° C. which is below the room temperature of about 25° C. No necking effect was present at 5° C. while a pronounced neck is formed when the temperature is at the room temperature as shown by FIG. 6.

In a second experiment, etching was performed in the normal two-phase etching apparatus of FIG. 3 at the room temperature, but with fairly rapid stirring of the piranha solution. Stirring essentially equalizes the concentration of etchant and the dissolved chalcogenide throughout the piranha solution. Thus stirring substantially eliminates the convective flow. The etched profile of a fiber core is shown in FIG. 14 by an optical micrograph of a 145 $\mu$m chalcogenide fiber. Again, no necking effect is observed in contrast to the etched profile of FIG. 6 in which the etchant is unstirred.

In the third experiment, a glass capillary with an inner diameter of about 1.5 mm was used instead of a glass vial of an inner diameter of about 2.5 cm. Since the fiber itself took up a substantial portion of the interior space in the capillary, convection was seriously impeded. A long, high aspect-ratio fiber tip without evidence of "necking" was produced.

The above three experiments demonstrate that convection contributes to the desirable necking effect for achieving a short taper section with a wide cone angle. When the convection is impeded, the etching profile becomes more isotropic and may cause diminishing of the necking effect so that it is more difficult to judge "completion" under such circumstance, since there is no "falloff" event.

The protective solvent overlayer serves to make tip shape more smooth and reproducible. Fibers etched without solvent overlayers are typically asymmetric and lack the smooth concave conical shape of fibers etched with solvent overlayers. FIGS. 14A, 14B and 14C show optical micrographs of several fiber tips etched without protective solvent overlayers. Further experimentation by the inventors indicated that the meniscus of piranha solution at an inserted fiber curves up if a solvent overlayer is not used, whereas with a properly-selected solvent overlayer the meniscus of the piranha solution at the fiber is essentially flat. This meniscus curvature is believed to disrupt the convection pattern responsible for producing smooth, concave-conical tips.

In addition, it is contemplated that the etched neck should point straight down from the meniscus. To test this prediction, etching was performed in the normal apparatus, but with the glass vial tilted at about 60° with respect to the vertical direction. As predicted, the tip thus produced pointed off-axis by approximately 60°. The tip was, however, asymmetric and not very sharp.

The two-phase etching process and system in accordance with the invention can be used to produce optical fiber probes with sharp and smooth tips and short transitional tapered section. Such etched probes can be used to resolve smaller feature size and to achieve a throughput several orders of magnitude higher than conventional IR fiber probes including the mechanically pulled counterparts. Thus the fiber probes produced in accordance with the invention may improve various near-field sensing systems and open up new applications.

For example, the use of pulled IR fiber probes in conventional NSIM systems has required intense sources of IR light such as expensive and bulky Free Electron Laser (FEL) due to the low throughput of conventional IR fiber probes. Therefore, IR fiber probes etched in accordance with the present invention may enable an NSIM system to use other less powerful IR sources to substitute the FELs. An optical parametric oscillator (OPO) laser, for example, may be used as the IR light source in a NSIM system. OPO lasers are far more common and much less costly (e.g., about 250K dollars) than FELs (e.g., about one million dollars plus shielded facility cost). This would make NSIM a much more accessible technique.

Etched IR fiber probes according to the invention may be used for high-spatial-resolution temperature measurements, such as those required in semiconductor device diagnostics. The present invention may also be used to make tapered IR-transparent fibers for attenuated total reflectance (ATR) "cells" in FTIR spectroscopy, see, Ertanlamontagne et al., Applied Spectroscopy, Vol. 49(8), pp. 1170 (1995).

Although the present invention has been described in detail with reference to a preferred embodiment and a few examples, one ordinarily skilled in the art to which this invention pertains will appreciate that various modifications and enhancements may be possible without departing from the spirits and scope that are encompassed by the following claims.

What is claimed is:
1. A method of etching a fiber, comprising:
providing an etchant solution which is chemically reactive to the fiber and has a first interfacial energy with respect to the fiber;
forming a layer of a protective solvent that is chemically inert to the fiber on top of said etchant solution, said protective solvent having a density smaller than said etchant solution and having a second interfacial energy with respect to the fiber, wherein said first interfacial energy is substantially equal to said second interfacial energy;

immersing a portion of the fiber in said etchant solution and said protective solvent; and maintaining convective flows surrounding said immersed portion within said etchant solution so that said immersed portion is broken away by etching to form a tapered tip within said etchant solution.

2. A method as in claim 1, wherein said etchant solution includes a mixture of an oxidizing acid and a hydrogen peroxide.

3. A method as in claim 1, wherein said protective solvent is a solution having a chemical material selected from a group consisting of tetramethylpentadecane (TMPD), polydimethylsiloxane (PDMS), and $CCl_4$.

4. A method as in claim 2, wherein said etchant solution is an approximately 7:3 mixture by volume of concentrated sulfuric acid and a hydrogen peroxide of 30% water solution.

5. A method as in claim 1, wherein the immersing step comprises holding the fiber in said etchant solution and said protective solvent in a substantially vertical orientation.

6. A method of etching a fiber, comprising:

providing an etchant solution which is chemically reactive to the fiber;

forming a layer of a protective solvent that is chemically inert to the fiber on top of said etchant solution and having a density smaller than said etchant solution;

selecting said etchant solution and said protective solvent to have predetermined densities and viscosity coefficients to form a substantially flat meniscus on the interface between said etchant solution and protective solvent around the fiber when immersed;

immersing a portion of the fiber in said etchant solution and said protective solvent; and maintaining convective flows surrounding said immersed portion within said etchant solution so that said immersed portion is broken away by etching to form a tapered tip within said etchant solution.

7. A method as in claim 6, wherein said etchant solution includes a mixture of an oxidizing acid and a hydrogen peroxide.

8. A method as in claim 6, wherein said protective solvent is a solution having a chemical material selected from a group consisting of tetramethylpentadecane (TMPD), polydimethylsiloxane (PDMS), and $CCl_4$.

9. A method as in claim 7, wherein said etchant solution is an approximately 7:3 mixture by volume of concentrated sulfuric acid and a hydrogen peroxide of 30% water solution.

10. A method as in claim 6, wherein the immersing step comprises holding the fiber in said etchant solution and said protective solvent in a substantially vertical orientation.

11. A method of forming a chalcogenide fiber probe by chemical etching, comprising:

processing a fiber having a chalcogenide fiber core to expose the fiber core at one end;

providing an etchant solution which is chemically reactive to said fiber core and has a first interfacial energy with respect to said fiber core;

forming a layer of a protective solvent chemically inert to said fiber core on top of said etchant solution, said protective solvent having a density smaller than said etchant solution and a second interfacial energy with respect to said fiber core, wherein said first interfacial energy is substantially equal to said second interfacial energy;

immersing said fiber core in said etchant solution and said protective solvent; and maintaining convective flows surrounding said immersed fiber core within said etchant solution so that a portion of said fiber core is broken away by etching at a location below interface between said protective solvent and etchant to form a tapered probe tip within said etchant solution.

12. A method as in claim 11, wherein the step of processing the fiber to expose the fiber core comprises removing polymer coating and fiber cladding outside the fiber core.

13. A method as in claim 12, wherein said polymer coating is removed by immersing the fiber in 4-chloro-1-butanol, methanol, or acetone.

14. A method as in claim 12, wherein said fiber cladding is SSe which is removed by immersing the clad fiber in a NaOH solution after said polymer coating is removed.

15. A method as in claim 11, wherein said etchant solution includes a mixture of an oxidizing acid and a hydrogen peroxide.

16. A method as in claim 11, wherein said protective solvent is a solution having a chemical material selected from a group consisting of tetramethylpentadecane (TMPD), polydimethylsiloxane (PDMS), and $CCl_4$.

17. A method as in claim 15, wherein said etchant solution is an approximately 7:3 mixture by volume of concentrated sulfuric acid and a hydrogen peroxide of 30% water solution.

18. A method as in claim 11, wherein the immersing step comprises holding the fiber in said etchant solution and said protective solvent in a substantially vertical orientation.

19. A method as in claim 11, further comprising:

removing the fiber from said etchant solution and said protective solvent after an immersed portion of said fiber core falls off from the fiber; and washing the fiber with a cleansing solution to remove residual of the etchant solution from the fiber.

20. A method as in claim 1, wherein the fiber comprises a chalcogenide glass.

21. A method as in claim 6, wherein the fiber comprises a chalcogenide glass.

* * * * *

UNITED STATES PATENT AND TRADEMARK OFFICE
CERTIFICATE OF CORRECTION

PATENT NO.   : 5,985,166
DATED        : November 16, 1999
INVENTOR(S)  : Marc A. Unger and Dmitri A. Kossakovski It is certified that error appears in the above-identified patent and that said Letters Patent is hereby corrected as shown below:

<u>Title page,</u>
Before "FIELD OF THE INVENTION", please insert the following:

-- STATEMENT AS TO FEDERALLY-SPONSORED RESEARCH

The U.S. Government has certain rights in this invention pursuant to Grant No. N00014-92-J-1901 awarded by ONR. --

Signed and Sealed this

Sixteenth Day of April, 2002

*Attest:*

JAMES E. ROGAN
*Attesting Officer*  *Director of the United States Patent and Trademark Office*